(12) United States Patent
Anderson et al.

(10) Patent No.: US 12,233,800 B2
(45) Date of Patent: Feb. 25, 2025

(54) FAIRLEAD DEVICE MOUNTING BRACKET ASSEMBLY FOR A VEHICLE WINCH ASSEMBLY

(71) Applicant: Rivian IP Holdings, LLC, Irvine, CA (US)

(72) Inventors: Alexandra Anderson, Escondido, CA (US); Sunilraj Chandrassekar, Irvine, CA (US); Matthew Tummers, Mississauga (CA)

(73) Assignee: Rivian IP Holdings, LLC, Irvine, CA (US)

( * ) Notice: Subject to any disclaimer, the term of this patent is extended or adjusted under 35 U.S.C. 154(b) by 212 days.

(21) Appl. No.: 17/943,238

(22) Filed: Sep. 13, 2022

(65) Prior Publication Data
US 2024/0083378 A1 Mar. 14, 2024

(51) Int. Cl.
*B60R 19/48* (2006.01)
*B66D 1/28* (2006.01)

(52) U.S. Cl.
CPC ............... *B60R 19/48* (2013.01); *B66D 1/28* (2013.01); *B66D 2700/0183* (2013.01)

(58) Field of Classification Search
CPC .. B60R 19/48; B66D 1/28; B66D 1/36; B66D 2700/0191
USPC .................................................. 293/102, 117
See application file for complete search history.

(56) References Cited

U.S. PATENT DOCUMENTS

| | | | | |
|---|---|---|---|---|
| 9,884,601 | B1* | 2/2018 | Candido | B60R 19/52 |
| 11,167,963 | B2* | 11/2021 | Fretz | B66D 1/36 |
| 11,603,036 | B2* | 3/2023 | Bowes | B60D 1/64 |
| 12,037,228 | B1* | 7/2024 | Clawson | B66D 1/36 |
| 2015/0232306 | A1* | 8/2015 | Upah | B66D 1/00 29/525.01 |
| 2022/0024735 | A1* | 1/2022 | Fretz | B66D 1/00 |
| 2023/0138730 | A1* | 5/2023 | Bowes | B66D 1/36 254/264 |

FOREIGN PATENT DOCUMENTS

GB 2566315 A * 3/2019 ............ B60D 1/185

* cited by examiner

*Primary Examiner* — Dennis H Pedder
(74) *Attorney, Agent, or Firm* — Patterson + Sheridan, LLP (57) ABSTRACT

A mounting bracket assembly for a vehicle, including: a mounting surface adapted to receive a fairlead device for a winch assembly of the vehicle; and a frame structure coupled to the mounting surface and adapted to be secured to a bumper structure of the vehicle; wherein the frame structure and the mounting surface are adapted to be collapsed or crushed towards the bumper structure when a sufficient force is applied to the fairlead device by a hook of the winch assembly when the hook is impacted during an impact event. The fairlead device and the hook are deflected into an opening formed in a front member of a bumper assembly with the hook being at least flush with an exterior surface of the front member of the bumper assembly.

20 Claims, 6 Drawing Sheets

FAIRLEAD DEVICE MOUNTING BRACKET ASSEMBLY FOR A VEHICLE WINCH ASSEMBLY

INTRODUCTION

The present disclosure relates generally to the automotive field. More particularly, the present disclosure relates to a fairlead device mounting bracket assembly for a vehicle winch assembly.

For a vehicle with an integrated winch assembly, the line, rope, or cable and hook of the winch assembly protruding through the associated fairlead device disposed in the front bumper structure is typically the forward-most structure of the vehicle. The same is true for a rear-mounted winch assembly. In general, the fairlead device is a slotted plate, with or without associated rollers, that guides the line, rope, or cable of the winch assembly, constraining its lateral movement and longitudinal retraction. Because the hook and fairlead device are typically the forward-most (or rearward-most) structures of the vehicle and are substantially rigid, their presence/absence in different vehicle and bumper structure variants can change impact test results and, accordingly, airbag sensor calibrations and the like, necessitating duplicative and expensive impact testing and manufacturing packages.

SUMMARY

The present disclosure provides a fairlead device for an integrated winch assembly that is coupled to the underlying bumper structure of a vehicle via a mounting bracket assembly that is collapsible or crushable, and optionally tunable, such that, in the event of an impact event, the hook of the winch assembly and the fairlead device may deflect into the surrounding bumper structure with a reduced degree of resistance that makes the hook and fairlead bracket substantially inconsequential for impact testing and airbag sensor calibration purposes. Upon the occurrence of an impact event, the hook of the winch assembly loads the fairlead bracket. The mounting bracket assembly then crushes or collapses into the underlying bumper structure, allowing the fairlead device and hook to slide rearwards, in the case of a front-mounted winch assembly, or forwards, in the case of a rear-mounted winch assembly, at which point the bumper structure of the vehicle is impacted in all cases as normal. The hook and fairlead device are slid out of the way without significant force or deceleration registered at any sensors. Thus, the presence of the hook and fairlead device does not affect impact test results or, accordingly, airbag sensor calibrations and the like, obviating the need for duplicative and expensive impact testing and manufacturing packages.

In one illustrative embodiment, the present disclosure provides a mounting bracket assembly for a vehicle, including: a mounting surface adapted to receive a fairlead device for a winch assembly of the vehicle; and a frame structure coupled to the mounting surface and adapted to be secured to a bumper structure of the vehicle; wherein the frame structure and the mounting surface are adapted to be collapsed or crushed towards the bumper structure when a sufficient force is applied to the fairlead device by a hook of the winch assembly when the hook is impacted during an impact event. The frame structure is adapted to be collapsed or crushed towards the bumper structure when the sufficient force is applied to the fairlead device by the hook of the winch assembly when the hook is impacted during the impact event such that the fairlead device and the hook are deflected into an opening formed in a front member of a bumper assembly with the hook being at least flush with an exterior surface of the front member of the bumper assembly. The frame structure is adapted to be secured to the bumper structure of the vehicle at a plurality of mounting holes formed through the frame structure via a plurality of bolts. Optionally, at least some of the plurality of mounting holes are longitudinally elongated such that at least a portion of the frame structure is adapted to translate to a degree with respect to at least some of the plurality of bolts and towards the bumper structure during the impact event. Optionally, the at least some of the plurality of bolts are adapted to be tightened to tune a degree of force required to translate the portion of the frame structure with respect to the at least some of the plurality of bolts and towards the bumper structure. A side portion of the frame structure includes a deformation structure that is adapted to enhance collapsing or crushing of at least a portion of the frame structure and the mounting surface towards the bumper structure during the impact event. Alternatively, the frame structure includes corner joints that are adapted to enhance collapsing or crushing of at least a portion of the frame structure and the mounting surface towards the bumper structure during the impact event. Optionally, the corner joints are adapted to be welded to tune a degree of force required collapse or crush the portion of the frame structure and the mounting surface towards the bumper structure.

In another illustrative embodiment, the present disclosure provides a bumper assembly for a vehicle, including: a bumper structure; a fairlead device for a winch assembly of the vehicle; and a mounting bracket assembly. The mounting bracket assembly includes: a mounting surface coupled to the fairlead device; and a frame structure coupled to the mounting surface and secured to the bumper structure; wherein the frame structure and the mounting surface are adapted to be collapsed or crushed towards the bumper structure when a sufficient force is applied to the fairlead device by a hook of the winch assembly when the hook is impacted during an impact event. The frame structure is adapted to be collapsed or crushed towards the bumper structure when the sufficient force is applied to the fairlead device by the hook of the winch assembly when the hook is impacted during the impact event such that the fairlead device and the hook are deflected into an opening formed in a front member of the bumper assembly with the hook being at least flush with an exterior surface of the front member of the bumper assembly. The frame structure is secured to the bumper structure at a plurality of mounting holes formed through the frame structure via a plurality of bolts. Optionally, at least some of the plurality of mounting holes are longitudinally elongated such that at least a portion of the frame structure is adapted to translate to a degree with respect to at least some of the plurality of bolts and towards the bumper structure during the impact event. Optionally, the at least some of the plurality of bolts are adapted to be tightened to tune a degree of force required to translate the portion of the frame structure with respect to the at least some of the plurality of bolts and towards the bumper structure. A side portion of the frame structure includes a deformation structure that is adapted to enhance collapsing or crushing of at least a portion of the frame structure and the mounting surface towards the bumper structure during the impact event. Alternatively, the frame structure includes corner joints that are adapted to enhance collapsing or crushing of at least a portion of the frame structure and the mounting surface towards the bumper structure during the impact event. Optionally, the corner joints are adapted to be welded to tune a degree of force required collapse or crush the portion of the frame structure and the mounting surface towards the bumper structure.

In a further illustrative embodiment, the present disclosure provides a vehicle including a bumper assembly, including: a bumper structure; a fairlead device for a winch assembly of the vehicle; and a mounting bracket assembly. The mounting bracket assembly includes: a mounting surface coupled to the fairlead device; and a frame structure coupled to the mounting surface and secured to the bumper structure; wherein the frame structure and the mounting surface are adapted to be collapsed or crushed towards the bumper structure when a sufficient force is applied to the fairlead device by a hook of the winch assembly when the hook is impacted during an impact event such that the fairlead device and the hook are deflected into an opening formed in a front member of the bumper assembly with the hook being at least flush with an exterior surface of the front member of the bumper assembly. The frame structure is secured to the bumper structure at a plurality of mounting holes formed through the frame structure via a plurality of bolts, wherein, optionally, at least some of the plurality of mounting holes are longitudinally elongated such that at least a portion of the frame structure is adapted to translate to a degree with respect to at least some of the plurality of bolts and towards the bumper structure during the impact event. A side portion of the frame structure includes a deformation structure that is adapted to enhance collapsing or crushing of at least a portion of the frame structure and the mounting surface towards the bumper structure during the impact event. Alternatively, the frame structure includes corner joints that are adapted to enhance collapsing or crushing of at least a portion of the frame structure and the mounting surface towards the bumper structure during the impact event.

BRIEF DESCRIPTION OF THE DRAWINGS

The present disclosure is illustrated and described herein with reference to the various drawings, in which like reference numbers are used to denote like assembly components/method steps, as appropriate, and in which.

DETAILED DESCRIPTION

The present disclosure provides a fairlead device for an integrated winch assembly that is coupled to the underlying bumper structure of a vehicle via a mounting bracket assembly that is movable, collapsible, or crushable, and optionally tunable, such that, in the event of an impact event, the hook of the winch assembly and the fairlead device may deflect into the surrounding bumper structure with a reduced degree of resistance that makes the hook and fairlead bracket substantially inconsequential for impact testing and sensor calibration purposes. Upon the occurrence of an impact event, the hook of the winch assembly loads the fairlead bracket. The mounting bracket assembly then crushes or collapses into the underlying bumper structure, allowing the fairlead device and hook to slide rearwards, in the case of a front-mounted winch assembly, or forwards, in the case of a rear-mounted winch assembly, at which point the bumper structure of the vehicle is impacted in all cases as normal. The hook and fairlead device are slid out of the way without significant force or deceleration registered at any sensors. Thus, the presence of the hook and fairlead device does not affect impact test results or, accordingly, sensor calibrations (e.g., airbag sensors) and the like, obviating the need for duplicative and expensive testing and manufacturing packages.

Figure 1:
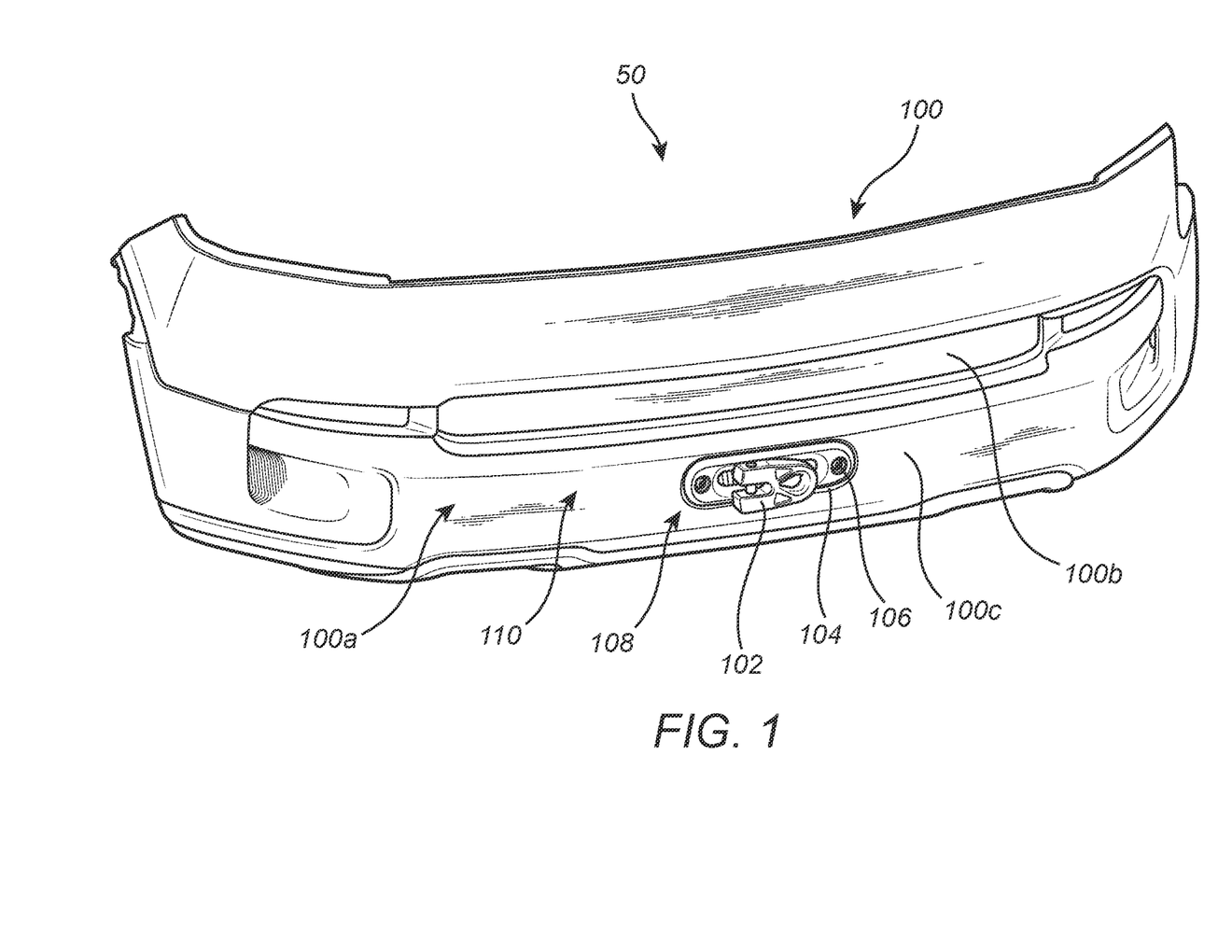
FIG. 1 is a perspective view of a front bumper/fascia assembly for a vehicle including a winch hook and fairlead device in accordance with the present disclosure.

FIG. 1 is a perspective view of a front bumper/fascia assembly 100 for a vehicle 50 including a winch hook 102 and fairlead device 104 in accordance with the present disclosure. In the embodiment illustrated, the bumper/fascia assembly 100 includes a bumper assembly 100a, which is typically made of a rigid metal material, at least in part, and an adjacent fascia assembly 100b, which may be made of a rigid plastic material. It should be noted that a front member 100c of the bumper assembly 100a is generally visible from the exterior of the vehicle 50 and may itself be made of a rigid plastic material for aesthetic purposes, if desired, but may also be made of a rigid metal material. A rigid metal bumper structure (not illustrated here) coupled to the frame (not illustrated) of the vehicle 50 is integrally formed with or coupled to and disposed behind the front member 100c of the bumper assembly 100a, as described in greater detail herein below. For the integrated vehicle winch assembly illustrated, the line, rope, or cable 201 (FIG. 2) and winch hook 102 pass through and protrude from the fairlead device 104 that is disposed in the front bumper assembly 100a, representing the forward-most structures of the vehicle 50. The same setup could be used for a rear-mounted winch assembly equally. As illustrated, the fairlead device 104 is a slotted plate, with or without associated rollers, that guides the line, rope, or cable 201 of the winch assembly, constraining and guiding its lateral movement and longitudinal retraction. The winch hook 102 and fairlead device 104 are the forward-most (or rearward-most) structures of the vehicle 50 and are themselves substantially rigid. The fairlead device 104 is coupled to a mounting bracket assembly (not illustrated here) described in greater detail herein below via a plurality of bolts 106 or the like, and ultimately to the bumper structure.

Figure 2:
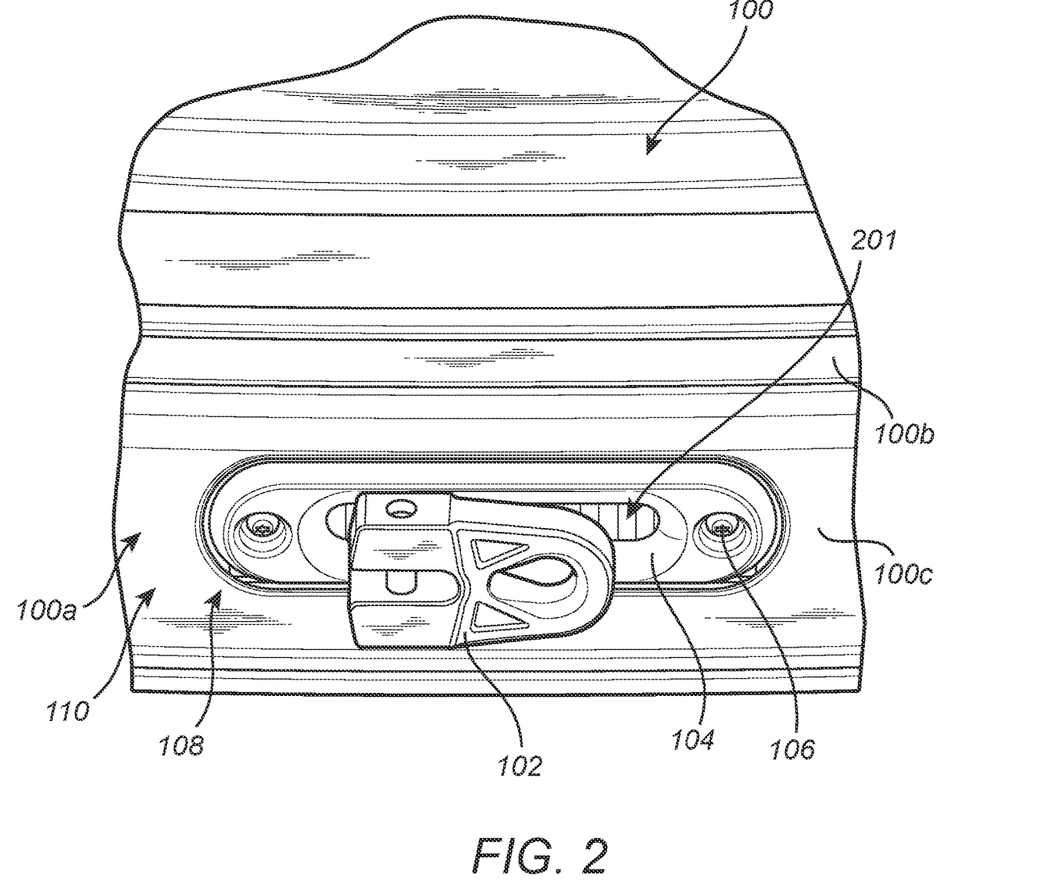
FIG. 2 is a close-up perspective view of the front bumper/fascia assembly of FIG. 1 including the winch hook and fairlead device in accordance with the present disclosure.

FIG. 2 is a close-up perspective view of the front bumper/fascia assembly 100 of FIG. 1 including the winch hook 102 and fairlead device 104 in accordance with the present disclosure. When sufficient force is applied to the fairlead device 104 by the winch hook 102 when the winch hook 102 is impacted during an impact event, the fairlead device 104 and winch hook 102 are deflected into an opening 108 formed in the front member 100c of the bumper assembly 100a with the winch hook 102 resultantly being deflected to be at least flush with the exterior surface 110 of the front member 100c of the bumper assembly 100a. The winch hook 102 and fairlead device 104 are therefore moved without significant force or deceleration registered at any sensors. Thus, the presence of the winch hook 102 and fairlead device 104 does not affect impact test results or, accordingly, sensor calibrations and the like, obviating the need for duplicative and expensive impact testing and manufacturing packages (e.g., with or without the integrated winch assembly).

Figure 3:
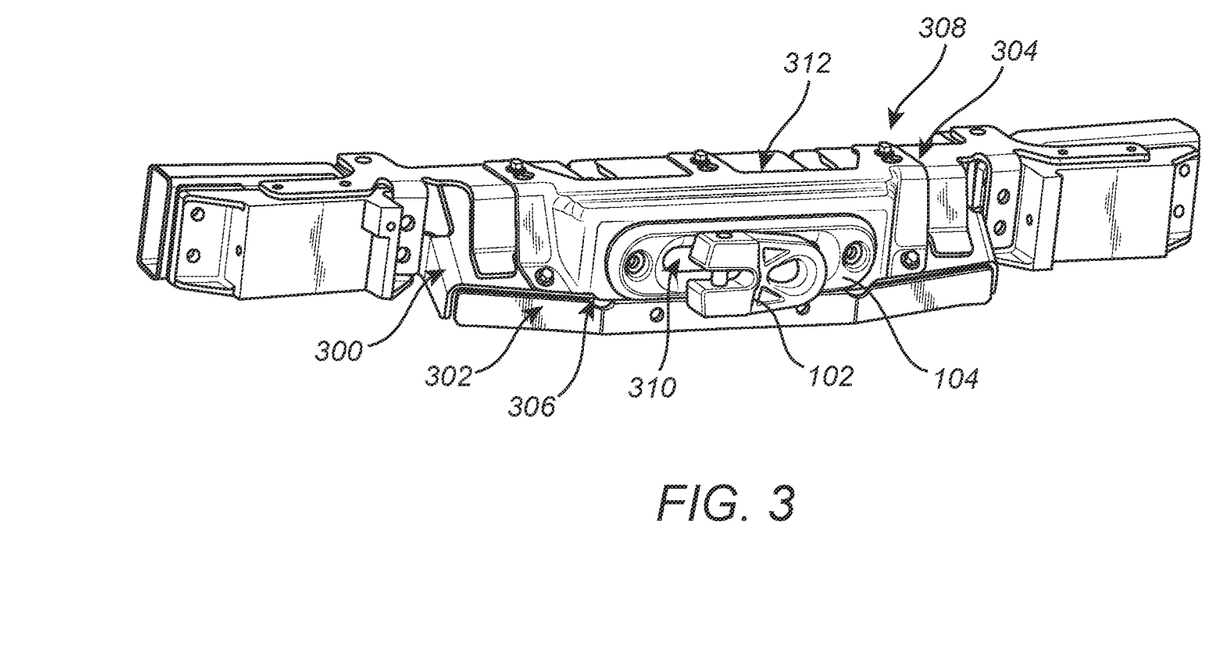
FIG. 3 is a perspective view of a front bumper structure for a vehicle including a winch hook, a fairlead device, and a crushable mounting bracket assembly in accordance with one illustrative embodiment of the present disclosure.

FIG. 3 is a perspective view of a front bumper structure 300 for the vehicle 50 (FIG. 1) including the winch hook 102, the fairlead device 104, and a crushable mounting bracket assembly 302 in accordance with one illustrative embodiment of the present disclosure. In some examples, the bumper structure 300 is made of a rigid metal material and is directly or indirectly coupled to the frame (not illustrated) of the vehicle 50. The bumper structure 300 extends laterally across the vehicle 50 and may be one-piece or include multiple pieces that are bolted and/or welded together to form a unitary structure. As provided herein above, the bumper structure 300 is typically disposed behind the front member 100c (FIGS. 1 and 2) of the bumper assembly 100a (FIGS. 1 and 2). The winch (not illustrated) of the winch assembly may be coupled to a rear side of the bumper structure 300 or to another structure of the vehicle 50. The mounting bracket assembly 302 includes a frame structure 304 and a mounting surface 306, both of which may be formed by any suitable method (e.g., stamped, tubular, etc.) The frame structure 304 is configured to be secured to the bumper structure 300 via a plurality of bolts 308 or the like. The components may also or alternatively be welded. The mounting surface 306 is configured to receive and retain the fairlead device 104, with the plurality of bolts 106 (FIGS. 1 and 2) being used to couple the components. Thus, the fairlead device 104 is coupled to the bumper structure 300 via the frame structure 304 and mounting surface 306. The mounting surface 306 and the fairlead device 104 define a common port 310 through which the line, rope, or cable 201 (FIG. 2) of the winch assembly is disposed.

A side portion of the frame structure 304 includes a deformation structure 312 that is adapted to enhance collapsing or crushing of at least a portion of the frame structure 304 and the mounting surface 306 towards the bumper structure 300 during an impact event. Multiple deformation structures 312 may also be provided on multiple side portions of the frame structure 304. This deformation structure 312 may be a stepped structure, an accordion structure, a plurality of defined openings or weakened areas, etc. that promote selective crushing of the mounting bracket assembly 302. Thus, the frame structure 304 is adapted to be crushed towards the bumper structure 300 when a sufficient force is applied to the fairlead device 104 by the winch hook 102 of the winch assembly when the winch hook 102 is impacted during the impact event such that the fairlead device 104 and the winch hook 102 are deflected into the opening 108 (FIGS. 1 and 2) formed in the front member 100c of the bumper assembly 100a with the winch hook 102 being deflected to be at least flush with the exterior surface 110 (FIGS. 1 and 2) of the front member 100c of the bumper assembly 100a.

Figure 4:
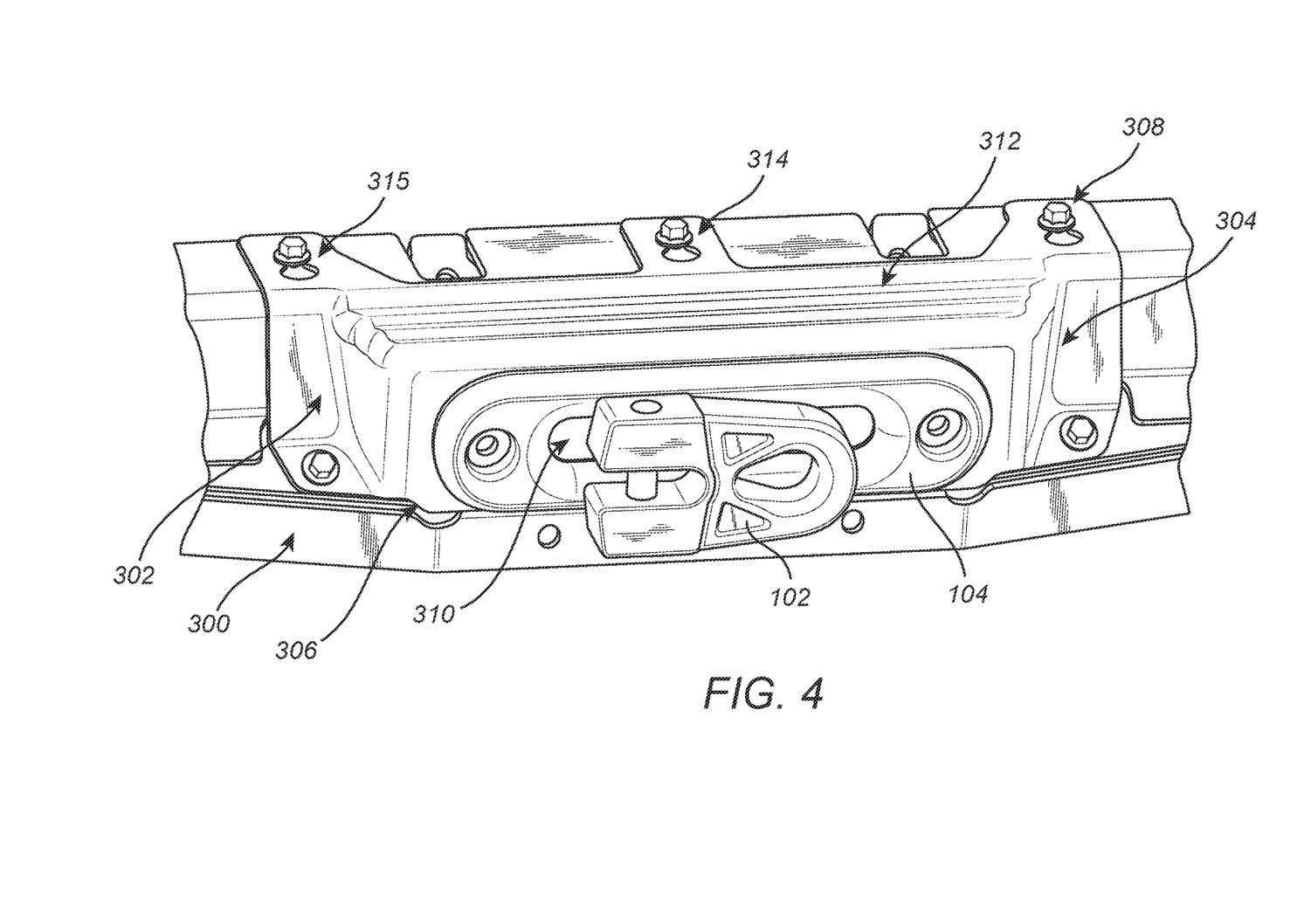
FIG. 4 is a close-up perspective view of the front bumper structure of FIG. 3 including the winch hook, the fairlead device, and the crushable mounting bracket assembly in accordance with one illustrative embodiment of the present disclosure.

FIG. 4 is a close-up perspective view of the front bumper structure 300 of FIG. 3 including the winch hook 102, the fairlead device 104, and the crushable mounting bracket assembly 302 in accordance with one illustrative embodiment of the present disclosure. Again, the bumper structure 300 is made of a rigid metal material and is directly or indirectly coupled to the frame (not illustrated) of the vehicle 50 (FIG. 1). The bumper structure 300 may be one-piece or include multiple pieces that are bolted and/or welded together. The mounting bracket assembly 302 includes the frame structure 304 and the mounting surface 306. The frame structure 304 is configured to be secured to the bumper structure 300 via the plurality of bolts 308 or the like. The components may also or alternatively be welded. The mounting surface 306 is configured to receive and retain the fairlead device 104, with the plurality of bolts 106 (FIGS. 1 and 2) being used to couple the components. The mounting surface 306 and the fairlead device 104 define the common port 310 through which the line, rope, or cable 201 (FIG. 2) of the winch assembly is disposed. The frame structure 304 is adapted to be secured to the bumper structure 300 at a plurality of mounting holes 314 formed through the frame structure 304 via the plurality of bolts 308. At least some of the plurality of mounting holes 314 are longitudinally elongated such that at least a portion of the frame structure 304 is adapted to translate to a degree with respect to at least some of the plurality of bolts 308 and towards the bumper structure 300 during the impact event. Further, at least some of the plurality of bolts 308 are adapted to be tightened to tune a degree of force required to translate the portion of the frame structure 304 with respect to the at least some of the plurality of bolts 308 and towards the bumper structure 300. The tighter the bolts 308, the more translation of the mounting assembly 302 is resisted. Thus, the frame structure 304 is also adapted to be collapsed towards the bumper structure 300 when a sufficient force is applied to the fairlead device 104 by the winch hook 102 of the winch assembly when the winch hook 102 is impacted during the impact event such that the fairlead device 104 and the winch hook 102 are deflected into the opening 108 (FIGS. 1 and 2) formed in the front member 100c (FIGS. 1 and 2) of the bumper assembly 100a (FIGS. 1 and 2) with the winch hook 102 being at least flush with the exterior surface 110 (FIGS. 1 and 2) of the front member 100c of the bumper assembly 100a. Because the bolts 308 may initially be disposed at one end of the longitudinally elongated mounting holes 314, the translation of the mounting assembly 302 may be essentially unidirectional, i.e., rearwards in compression for a front-mounted winch assembly and frontwards in compression for a rear-mounted winch assembly. Thus, the front-mounted winch assembly is strong in tension, such as when in use, but may slide rearwards given sufficient compression during an impact event. Likewise, the rear-mounted winch assembly is strong in tension, such as when in use, but may slide frontwards given sufficient compression during an impact event.

It should be noted that the linearly elongated mounting holes 314 located along the top portion of the frame structure 304 may define a widened release portion 315, such that when the frame structure 304 is compressed to a certain degree, the top portion of the frame structure 304 is actually able to escape the retention bolts 308, thereby releasing the top portion of the frame structure 304 and further enhancing purposeful crushing of the mounting assembly 302.

In the embodiment illustrated, the frame structure 304 is provided with the ability to translate to a degree at the top of the frame structure 304 and bumper structure 300 (with elongated holes 314), but not at the bottom of the frame structure 304 and bumper structure 300 (with round holes 314), thereby allowing the mounting surface 306 and the fairlead device 104 to translate in a pivoting manner when contacted by the winch hook 120 during the impact event. Further, with the deformation structure 312 at the top of the frame structure 304, the frame structure 304 is provided with the ability to crush to a greater degree at the top of the frame structure 304 and bumper structure 300, but to a lesser degree at the bottom of the frame structure 304 and bumper structure 300, thereby allowing the mounting surface 306 and the fairlead device 104 to crush in an essentially pivoting manner when contacted by the winch hook 120 during the impact event. This impact behavior may be enhanced by a generally sloped configuration of the rear of the frame structure 304 as well, being sloped from front-bottom to rear-top.

Figure 5:
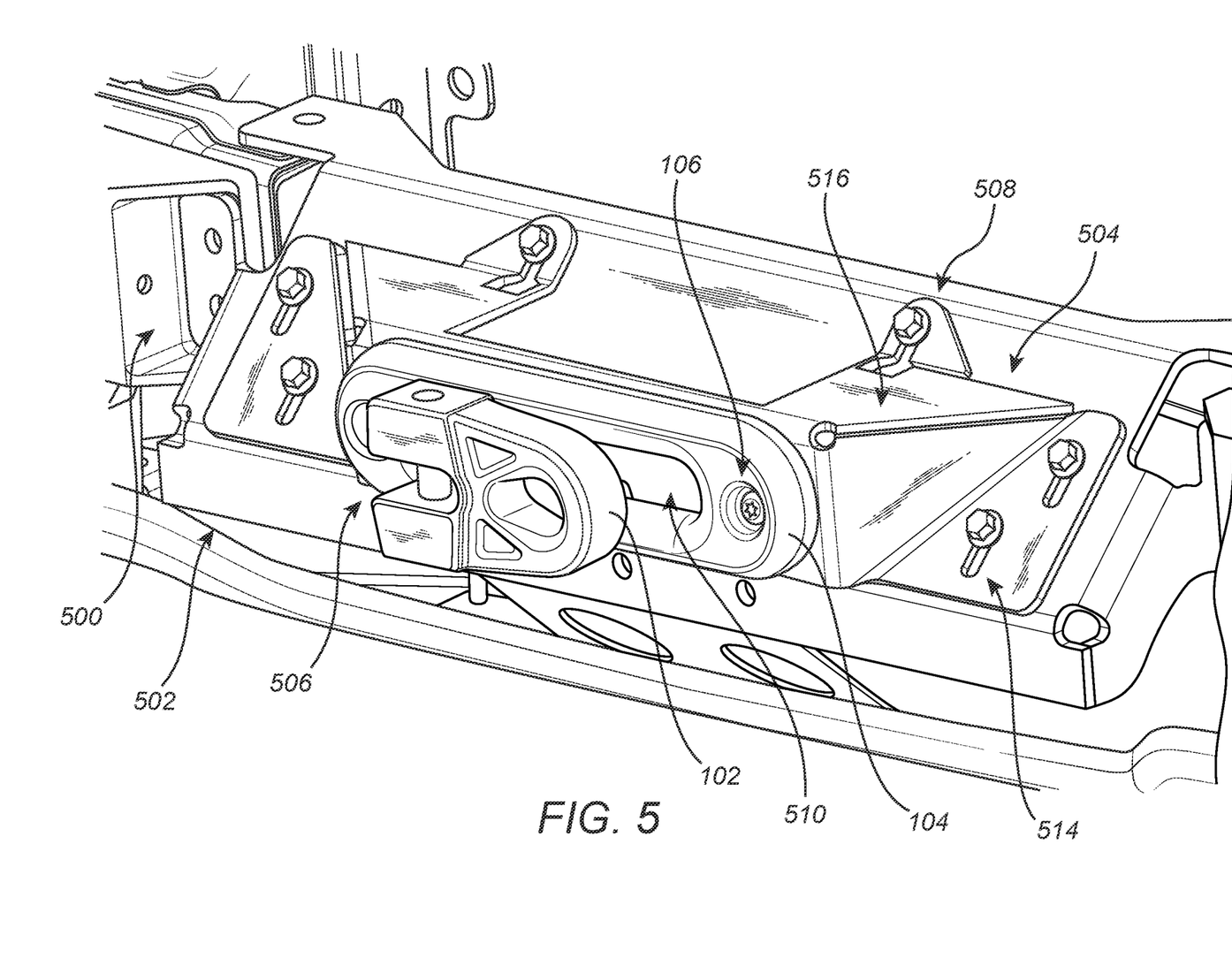
FIG. 5 is a perspective view of a front bumper structure for a vehicle including a winch hook, a fairlead device, and a tunable, collapsible mounting bracket assembly in accordance with another illustrative embodiment of the present disclosure.

FIG. 5 is a perspective view of a front bumper structure 500 for a vehicle 50 (FIG. 1) including the winch hook 102, the fairlead device 104, and a tunable, collapsible mounting bracket assembly 502 in accordance with another illustrative embodiment of the present disclosure. The bumper structure 500 is again made of a rigid metal material and is directly or indirectly coupled to the frame (not illustrated) of the vehicle 50. The bumper structure 500 may be one-piece or include multiple pieces that are bolted and/or welded together. As provided herein above, the bumper structure 500 is typically disposed behind the front member 100c (FIGS. 1 and 2) of the bumper assembly 100a (FIGS. 1 and 2). The mounting bracket assembly 502 includes a stamped or tubular frame structure 504 and a mounting surface 506. The frame structure 504 is configured to be secured to the bumper structure 500 via a plurality of bolts 508 or the like. The components may also or alternatively be welded. The mounting surface 506 is configured to receive and retain the fairlead device 104, with the plurality of bolts 106 being used to couple the components. Thus, the fairlead device 104 is coupled to the bumper structure 500 via the frame structure 504 and mounting surface 506. The mounting surface 506 and the fairlead device 104 define a common port 510 through which the line, rope, or cable 201 (FIG. 2) of the winch assembly is disposed. One or more corner portions of the frame structure 504 include a joint structure 516 or the like that is adapted to enhance collapsing or crushing of at least a portion of the frame structure 504 and the mounting surface 506 towards the bumper structure 500 during an impact event. This joint structure 516 may one or more linear welded or bridging regions, a plurality of defined openings or weakened areas, etc. that promote selective collapsing of the mounting bracket assembly 502, with the mounting surface 506 more easily collapsing into the bumper structure 502. Thus, the frame structure 504 is adapted to be collapsed towards the bumper structure 500 when a sufficient force is applied to the fairlead device 104 by the winch hook 102 of the winch assembly when the winch hook 102 is impacted during the impact event such that the fairlead device 104 and the winch hook 102 are deflected into the opening 108 (FIGS. 1 and 2) formed in the front member 100c of the bumper assembly 100a with the winch hook 102 being at least flush with the exterior surface 110 (FIGS. 1 and 2) of the front member 100c of the bumper assembly 100a.

Figure 6:
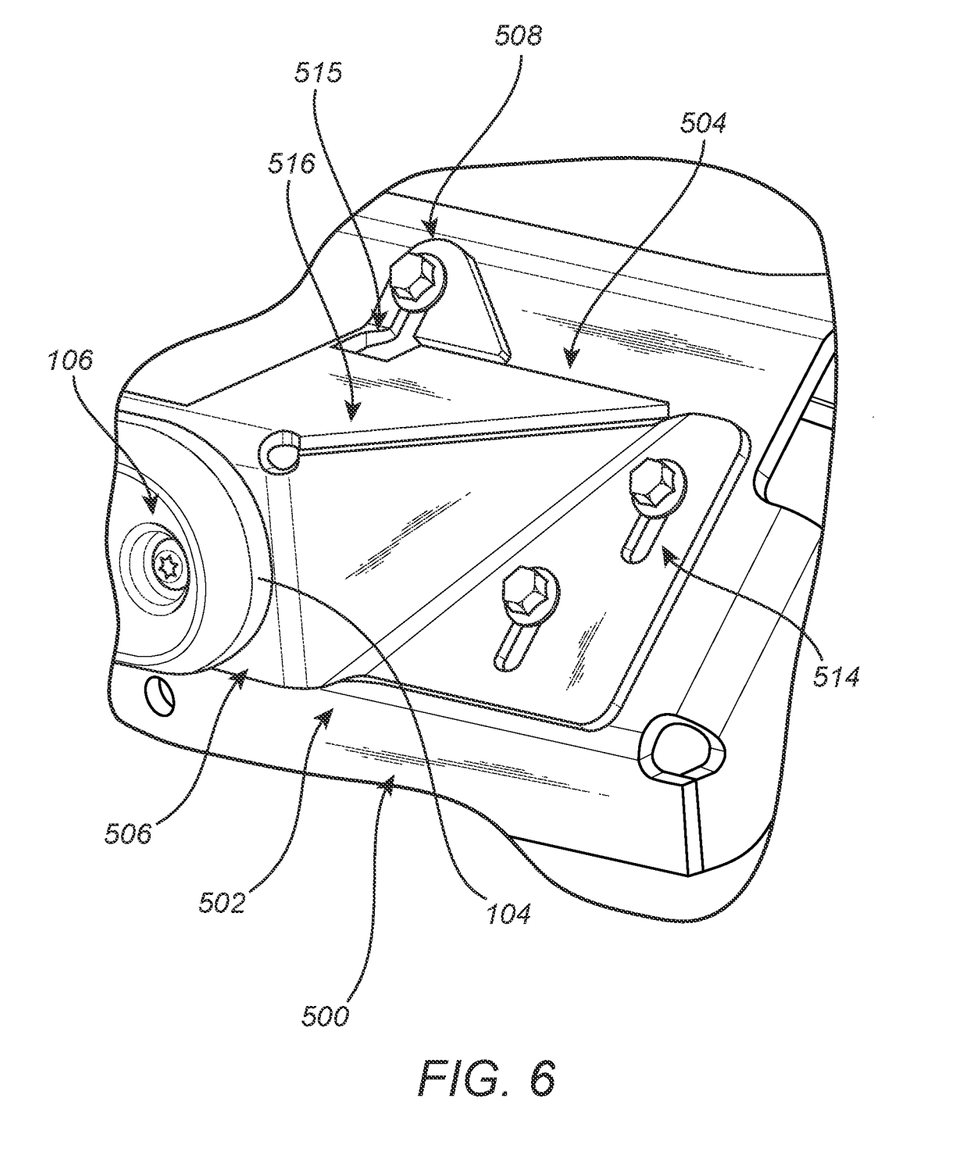
FIG. 6 is a close-up perspective view of the front bumper structure of FIG. 5 including the winch hook, the fairlead device, and the tunable, collapsible mounting bracket assembly in accordance with another illustrative embodiment of the present disclosure.

FIG. 6 is a close-up perspective view of the front bumper structure 500 of FIG. 5 including the winch hook 102, the fairlead device 104, and the tunable, collapsible mounting bracket assembly 502 in accordance with another illustrative embodiment of the present disclosure. Again, the bumper structure 500 is made of a rigid metal material and is directly or indirectly coupled to the frame (not illustrated) of the vehicle 50 (FIG. 1). The bumper structure 500 may be one-piece or include multiple pieces that are bolted and/or welded together. The mounting bracket assembly 502 includes the frame structure 504 and the mounting surface 506. The frame structure 504 is configured to be secured to the bumper structure 500 via the plurality of bolts 508 or the like. The components may also or alternatively be welded. The mounting surface 506 is configured to receive and retain the fairlead device 104, with the plurality of bolts 106 being used to couple the components. The mounting surface 506 and the fairlead device 104 define the common port 510 through which the line, rope, or cable 201 (FIG. 2) of the winch assembly is disposed. The frame structure 504 is adapted to be secured to the bumper structure 500 at a plurality of mounting holes 514 formed through the frame structure 504 via the plurality of bolts 508. At least some (if not all) of the plurality of mounting holes 514 are longitudinally elongated such that at least a portion (if not all) of the frame structure 504 is adapted to translate to a degree with respect to at least some (if not all) of the plurality of bolts 508 and towards the bumper structure 500 during the impact event. Further, at least some (if not all) of the plurality of bolts 508 are adapted to be tightened to tune a degree of force required to translate the portion (if not all) of the frame structure 504 with respect to the at least some (if not all) of the plurality of bolts 508 and towards the bumper structure 500. The tighter the bolts 508, the more translation of the mounting assembly 502 is resisted. Thus, the frame structure 504 is again adapted to be collapsed towards the bumper structure 500 when a sufficient force is applied to the fairlead device 104 by the winch hook 102 of the winch assembly when the winch hook 102 is impacted during the impact event such that the fairlead device 104 and the winch hook 102 are deflected into the opening 108 (FIGS. 1 and 2) formed in the front member 100c (FIGS. 1 and 2) of the bumper assembly 100a (FIGS. 1 and 2) with the winch hook 102 being at least flush with the exterior surface 110 (FIGS. 1 and 2) of the front member 100c of the bumper assembly 100a. Because the bolts 508 may initially be disposed at one end of the longitudinally elongated mounting holes 514, the translation of the mounting assembly 502 may be substantially unidirectional, i.e., rearwards for a front-mounted winch assembly and frontwards for a rear-mounted winch assembly. Thus, the front-mounted winch assembly is strong in tension, such as when in use, but may slide rearwards given sufficient compression during an impact event. Likewise, the rear-mounted winch assembly is strong in tension, such as when in use, but may slide frontwards given sufficient compression during an impact event.

It should again be noted that the linearly elongated mounting holes 514 located along the top portion of the frame structure 504 may define a widened release portion 515, such that when the frame structure 504 is compressed to a certain degree, the top portion of the frame structure 504 is actually able to escape the retention bolts 508, thereby releasing the top portion of the frame structure 504 and further enhancing purposeful collapsing of the mounting assembly 502.

In the embodiment illustrated, the frame structure 504 may be provided with the ability to translate to a greater degree at the top of the frame structure 504 and bumper structure 500, but to a lesser degree at the bottom of the frame structure 504 and bumper structure 500, thereby allowing the mounting surface 506 and the fairlead device 104 to translate in a pivoting manner when contacted by the winch hook 120 during the impact event. Further, with the joint structure 516 at the top of the frame structure 504, the frame structure 504 is provided with the ability to collapse to a greater degree at the top of the frame structure 504 and bumper structure 500, but to a lesser degree at the bottom of the frame structure 504 and bumper structure 500, thereby allowing the mounting surface 506 and the fairlead device 104 to crush in a pivoting manner when contacted by the winch hook 120 during the impact event. This impact behavior may be enhanced by a generally sloped configuration of the rear of the frame structure 504 as well, being sloped from front-bottom to rear-top.

Thus, the present disclosure provides a fairlead device for an integrated winch assembly that is coupled to the underlying bumper structure of a vehicle via a mounting bracket assembly that is collapsible and/or crushable, and optionally tunable, such that, in the event of an impact event, the hook of the winch assembly and the fairlead device may deflect into the surrounding bumper structure with a reduced degree of resistance that makes the hook and fairlead bracket substantially inconsequential for impact testing and airbag sensor calibration purposes. Upon the occurrence of an impact event, the hook of the winch assembly loads the fairlead bracket. The mounting bracket assembly then crushes or collapses into the underlying bumper structure, allowing the fairlead device and hook to slide rearwards, in the case of a front-mounted winch assembly, or forwards, in the case of a rear-mounted winch assembly, at which point the bumper structure of the vehicle is impacted in all cases as normal. The hook and fairlead device are slid out of the way without significant force or deceleration registered at any sensors. Thus, the presence of the hook and fairlead device does not affect impact test results or, accordingly, airbag sensor calibrations and the like, obviating the need for duplicative and expensive impact testing and manufacturing packages. The mounting bracket assembly of the present disclosure allows the winch hook and fairlead device to be more easily compressed into the vehicle, but provides conventional strength laterally and in tension.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A mounting bracket assembly for a vehicle, comprising:
a mounting surface adapted to receive a fairlead device for a winch assembly of the vehicle; and
a frame structure coupled to the mounting surface and adapted to be secured to a bumper structure of the vehicle;
wherein the frame structure and the mounting surface are adapted to be collapsed towards the bumper structure when a sufficient force is applied to the fairlead device by a hook of the winch assembly when the hook is impacted during an impact event.

2. The mounting bracket assembly of claim 1, wherein the frame structure is adapted to be collapsed towards the bumper structure when the sufficient force is applied to the fairlead device by the hook of the winch assembly when the hook is impacted during the impact event.

3. The mounting bracket assembly of claim 1, wherein the frame structure is adapted to be secured to the bumper structure of the vehicle at a plurality of mounting holes formed through the frame structure via a plurality of bolts.

4. The mounting bracket assembly of claim 3, wherein at least some of the plurality of mounting holes are longitudinally elongated such that at least a portion of the frame structure is adapted to translate to a degree with respect to at least some of the plurality of bolts and towards the bumper structure during the impact event.

5. The mounting bracket assembly of claim 4, wherein the at least some of the plurality of bolts are adapted to be tightened to tune a degree of force required to translate the portion of the frame structure with respect to the at least some of the plurality of bolts and towards the bumper structure.

6. The mounting bracket assembly of claim 1, wherein a side portion of the frame structure comprises a deformation structure that is adapted to enhance collapsing or crushing of at least a portion of the frame structure and the mounting surface towards the bumper structure during the impact event.

7. The mounting bracket assembly of claim 1, wherein the frame structure comprises corner joints that are adapted to enhance collapsing or crushing of at least a portion of the frame structure and the mounting surface towards the bumper structure during the impact event.

8. The mounting bracket assembly of claim 7, wherein the corner joints are adapted to collapse or crush the portion of the frame structure and the mounting surface towards the bumper structure.

9. A bumper assembly for a vehicle, comprising:
a bumper structure;
a fairlead device for a winch assembly of the vehicle; and
a mounting bracket assembly, comprising:
a mounting surface coupled to the fairlead device; and
a frame structure coupled to the mounting surface and secured to the bumper structure;
wherein the frame structure and the mounting surface are adapted to be collapsed towards the bumper structure when a sufficient force is applied to the fairlead device by a hook of the winch assembly when the hook is impacted during an impact event.

10. The bumper assembly of claim 9, wherein the frame structure is adapted to be collapsed towards the bumper structure when the sufficient force is applied to the fairlead device by the hook of the winch assembly when the hook is impacted during the impact event.

11. The bumper assembly of claim 9, wherein the frame structure is secured to the bumper structure at a plurality of mounting holes formed through the frame structure via a plurality of bolts.

12. The bumper assembly of claim 11, wherein at least some of the plurality of mounting holes are longitudinally elongated such that at least a portion of the frame structure is adapted to translate to a degree with respect to at least some of the plurality of bolts and towards the bumper structure during the impact event.

13. The bumper assembly of claim 12, wherein the at least some of the plurality of bolts are adapted to be tightened to tune a degree of force required to translate the portion of the frame structure with respect to the at least some of the plurality of bolts and towards the bumper structure.

14. The bumper assembly of claim 9, wherein a side portion of the frame structure comprises a deformation structure that is adapted to enhance collapsing or crushing of at least a portion of the frame structure and the mounting surface towards the bumper structure during the impact event.

15. The bumper assembly of claim 9, wherein the frame structure comprises corner joints that are adapted to enhance collapsing or crushing of at least a portion of the frame structure and the mounting surface towards the bumper structure during the impact event.

16. The bumper assembly of claim 15, wherein the corner joints are adapted to collapse or crush the portion of the frame structure and the mounting surface towards the bumper structure.

17. A vehicle, comprising:
a bumper assembly, comprising:
   a bumper structure;
   a fairlead device for a winch assembly of the vehicle; and
   a mounting bracket assembly, comprising:
      a mounting surface coupled to the fairlead device; and
      a frame structure coupled to the mounting surface and secured to the bumper structure;
      wherein the frame structure and the mounting surface are adapted to be collapsed towards the bumper structure when a sufficient force is applied to the fairlead device by a hook of the winch assembly when the hook is impacted during an impact event.

18. The vehicle of claim 17, wherein the frame structure is secured to the bumper structure at a plurality of mounting holes formed through the frame structure via a plurality of bolts, wherein at least some of the plurality of mounting holes are longitudinally elongated such that at least a portion of the frame structure is adapted to translate to a degree with respect to at least some of the plurality of bolts and towards the bumper structure during the impact event.

19. The vehicle of claim 17, wherein a side portion of the frame structure comprises a deformation structure that is adapted to enhance collapsing or crushing of at least a portion of the frame structure and the mounting surface towards the bumper structure during the impact event.

20. The vehicle of claim 17, wherein the frame structure comprises corner joints that are adapted to enhance collapsing or crushing of at least a portion of the frame structure and the mounting surface towards the bumper structure during the impact event.

* * * * *